United States Patent
Arndt et al.

(10) Patent No.: US 8,694,832 B2
(45) Date of Patent: Apr. 8, 2014

(54) ASSIST THREAD ANALYSIS AND DEBUG MECHANISM

(75) Inventors: Richard Louis Arndt, Austin, TX (US); Giles Roger Frazier, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 13/039,833

(22) Filed: Mar. 3, 2011

(65) Prior Publication Data

US 2012/0226946 A1 Sep. 6, 2012

(51) Int. Cl.
*G06F 11/00* (2006.01)

(52) U.S. Cl.
USPC ....... 714/38.1; 714/25; 714/38.11; 714/38.13

(58) Field of Classification Search
USPC .............. 714/10, 15, 20, 25, 27, 38.1, 38.11, 714/38.12, 38.13, 48, 49
See application file for complete search history.

(56) References Cited

U.S. PATENT DOCUMENTS

| | | | |
|---|---|---|---|
| 6,938,246 B2 * | 8/2005 | Alford et al. ............... | 714/38.13 |
| 7,458,078 B2 | 11/2008 | DeWitt, Jr. et al. ........... | 718/104 |
| 7,475,399 B2 | 1/2009 | Arimilli et al. ............... | 718/104 |
| 7,631,307 B2 | 12/2009 | Wang et al. .................. | 718/100 |
| 7,779,238 B2 | 8/2010 | Kosche et al. ................ | 712/227 |
| 2007/0180322 A1* | 8/2007 | Todoroki et al. ............... | 714/34 |
| 2007/0214342 A1 | 9/2007 | Newburn et al. .............. | 712/216 |
| 2007/0288902 A1 | 12/2007 | Lev et al. ...................... | 717/124 |
| 2007/0288907 A1 | 12/2007 | Olivier et al. ................. | 717/129 |
| 2008/0115113 A1 | 5/2008 | Codrescu et al. ............. | 717/127 |
| 2008/0288730 A1 | 11/2008 | Heller, Jr. et al. ............. | 711/159 |
| 2008/0301700 A1 | 12/2008 | Junkins et al. ................ | 718/108 |
| 2009/0199046 A1* | 8/2009 | Arimilli et al. ................ | 714/42 |
| 2009/0319999 A1 | 12/2009 | Stall et al. ..................... | 717/128 |
| 2011/0307741 A1* | 12/2011 | Chen et al. .................... | 714/38.1 |
| 2012/0005138 A1 | 1/2012 | Cantin et al. .................... | 706/13 |
| 2012/0005260 A1 | 1/2012 | Kosaraju et al. .............. | 709/203 |
| 2012/0117659 A1 | 5/2012 | Gearhart et al. ................ | 726/28 |

FOREIGN PATENT DOCUMENTS

CA 2680597 12/2009 ............... G06F 9/44

* cited by examiner

*Primary Examiner* — Joseph D Manoskey
(74) *Attorney, Agent, or Firm* — VanLeeuwen & VanLeeuwen; Matthew W. Baca (57) ABSTRACT

A processor recognizes a request from a program executing on a first hardware thread to initiate software code on a second hardware thread. In response, the second hardware thread initiates and commences executing the software code. During execution, the software code uses hardware registers of the second hardware thread to store data. Upon termination of the software code, the second hardware thread invokes a hypervisor program, which extracts data from the hardware registers and stores the extracted data in a shared memory area. In turn, a debug routine executes and retrieves the extracted data from the shared memory area.

16 Claims, 10 Drawing Sheets

ASSIST THREAD ANALYSIS AND DEBUG MECHANISM

TECHNICAL FIELD

The present disclosure relates to an assist thread analysis and debug mechanism. More particularly, the present disclosure relates to a hypervisor extracting assist thread data prior to releasing the assist thread's hardware resources to a resource pool.

BACKGROUND

Today's computer systems often include multi-threaded processors that execute independent instruction streams. A software program executing on a hardware thread may request control of a different hardware thread (assist thread), such as for prefetching data, performing calculations, executing not-yet-taken branches speculatively, or executing a particular subroutine. When hardware resources are available, the assist thread initiates and commences code execution. At times, the assist thread may terminate prematurely due to factors such as software code quality or processor thread prioritization.

SUMMARY

A processor recognizes a request from a program executing on a first hardware thread to initiate software code on a second hardware thread. In response, the second hardware thread initiates and commences executing the software code. During execution, the software code uses hardware registers of the second hardware thread to store data. Upon termination of the software code, the second hardware thread invokes a hypervisor program, which extracts data from the hardware registers and stores the extracted data in a shared memory area. In turn, a debug routine executes and retrieves the extracted data from the shared memory area.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

Figure 1:
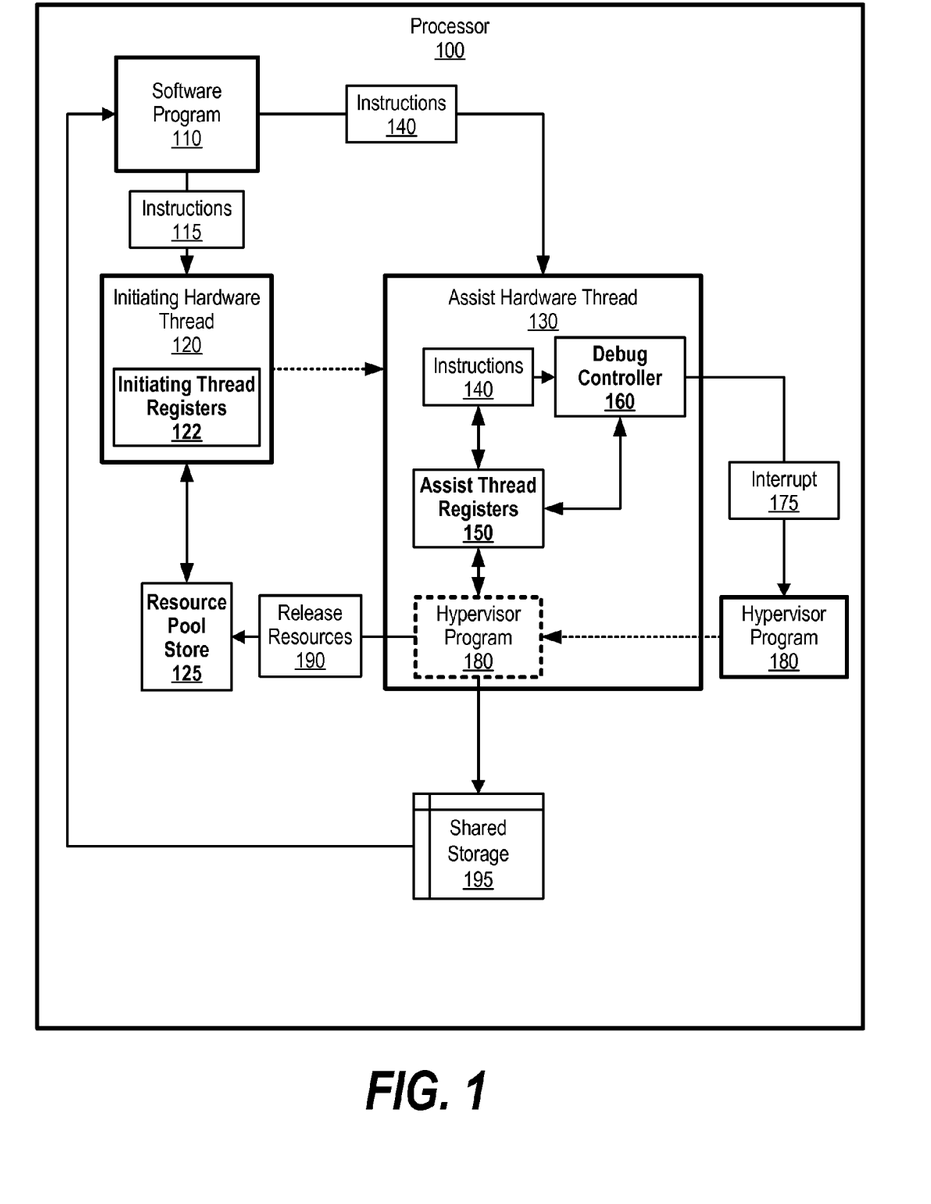
FIG. 1 is a diagram showing an assist hardware thread invoking a hypervisor that extracts data prior to releasing the assist hardware thread's resources to a resource pool.

FIG. 1 is a diagram showing an assist hardware thread invoking a hypervisor that extracts data prior to releasing the assist hardware thread's resources to a resource pool. Assist hardware thread 130 includes logic (debug controller 160) that passes control to hypervisor program 180, which extracts data and stores the data in shared storage 195. In turn, software program 110 (executing on initiating hardware thread 120) retrieves the data and debugs assist hardware thread 130 accordingly.

Processor 100 assigns initiating hardware thread 120 to software program 110 when software program 110 commences executing. As software program 110 executes instructions 115 on initiating hardware thread 120, one of instructions 115 is an instruction that requests an assist hardware thread, such as a "branch and initiate instruction." The branch and initiate instruction instructs initiating hardware thread 120 to invoke another (assist) hardware thread, such as for executing a subset of software program 110's instructions (instructions 140).

In one embodiment, the branch and initiate instruction may be a branch and initiate light (BAIL) instruction or a branch and initiate heavy (BAIH) instruction. As discussed herein, differences between a BAIL instruction and a BAIH instruction are that a BAIH instruction ensures that all initiating hardware thread store operations are visible to an assist hardware thread when the assist hardware thread begins execution. As such, when a software program requires memory synchronization, the software program may utilize a BAIH instruction instead of a BAIL instruction. In contrast, when a software program does not require memory synchronization, the software program may utilize a BAIL instruction instead of the BAIH instruction since the BAIL instruction does not guarantee memory synchronization and, in turn, executes faster. As those skilled in the art can appreciate, other types of branch and initiate instructions may be available to instruct an initiating hardware thread to initiate an assist hardware thread.

When initiating hardware thread 120 executes the branch and initiate instruction, initiating hardware thread 120 checks resource pool store 125 to determine whether another hardware thread is available. For example, processor 100 may include a bank of hardware threads, and resource pool store 125 includes information that indicates which of the hardware threads are available. When an assist hardware thread is available, initiating hardware thread 120 invokes assist hardware thread 130 to execute instructions 140 and copies a "debug control bit" from initiation thread registers 122 to assist thread registers 150, which informs assist hardware thread 130 that initiating hardware thread 120 is in debug mode (see FIGS. 2-5 and corresponding text for further details). In one embodiment, initiating hardware thread 120 and assist hardware thread 130 each have a dedicated execution unit for executing instructions. Assist thread registers 150 are registers accessible to software executing on the assist hardware thread (130). In one embodiment, registers 150 are dedicated (inaccessible by other hardware threads) to assist hardware thread 130 while assist hardware thread 130 executes code.

Once assist hardware thread 130 initiates, software program 110 executes instructions 140 on assist hardware thread 130. At some point, assist hardware thread 130 stops executing instructions 140. This may be due to 1) assist hardware thread 130 completes code execution; 2) assist hardware thread 130 executes a stop assist thread (SAT) instruction (see FIG. 8 and corresponding text for further details); 3) assist hardware thread 120 executes a SAT instruction that terminates assist hardware thread 120; or 4) processor 100 terminates assist hardware thread 130.

When assist hardware thread 130 stops executing instructions 140, debug controller 160 checks whether the debug control bit is set in assist thread registers 150. When detected that the debug control bit is set, debug controller 160 sends interrupt 175 to hypervisor program 180. In turn, assist hardware thread 130 commences executing hypervisor program 180.

Hypervisor program 180 extracts data from assist thread registers 150, and stores the extracted data in shared storage 195. In one embodiment, hypervisor program 180 retrieves a location corresponding to initiating hardware thread 120 from assist thread registers 150, and stores the extracted data in shared storage 195 that corresponds to the identified location (see FIGS. 2, 4-5, and corresponding text for further details).

In one embodiment, hypervisor program 180 extracts "debug data" from assist thread registers 150. In this embodiment, debug data is data that is useful to debug software program 110, particularly instructions 140. The debug data may be extracted from assist thread status registers, general purpose registers, arithmetic registers (e.g. floating point registers), various control registers, and other special-purpose registers that may be useful in debugging instructions 140. The debug data is different from the data the software program 110 is designed to store in memory (e.g., results of calculations or other work, indicators showing how far along a particular task the program had progressed, etc.).

After hypervisor program 180 stores the extracted data, hypervisor program 180 executes a hypervisor release assist thread (HRLAT) instruction, which releases (release resources 190) assist hardware thread 130's hardware resources to resource pool store 125. At some point later in time, software program 110 (executing on initiating hardware thread 120) retrieves the extracted data from shared storage 195 and debugs assist hardware thread 130 accordingly.

Figure 2:
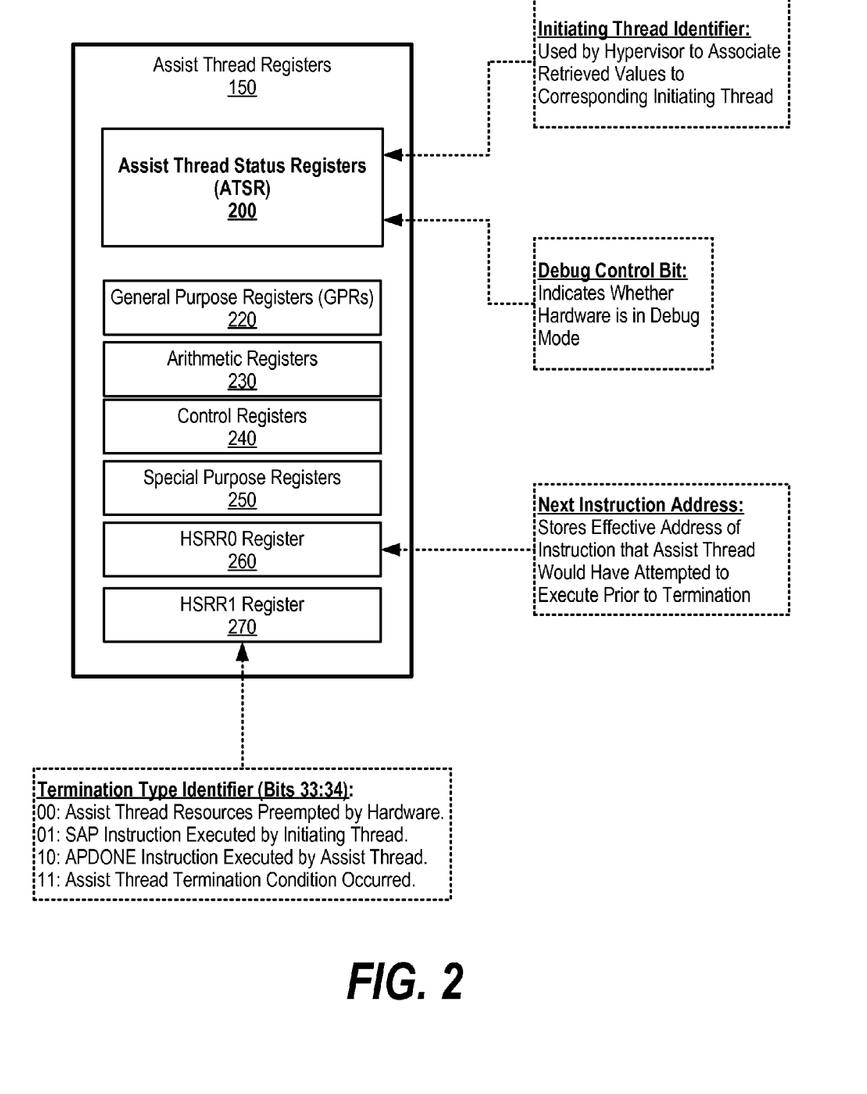
FIG. 2 is a diagram showing assist thread registers that an assist hardware thread utilizes during software code execution.

FIG. 2 is a diagram showing assist thread registers that an assist hardware thread utilizes during software code execution. Assist thread registers 150 includes assist thread status registers 200, general purpose registers 220, arithmetic registers 230 (e.g. floating point registers), control registers 240, special-purpose registers 250, and hypervisor interrupt registers 260-270. A hypervisor extracts debug data from some or all of assist thread registers 150 when invoked by an assist hardware thread in debug mode.

Assist thread status registers (ATSR) 200 stores a debug control bit and an initiating thread identifier. The debug control bit informs a debug controller whether hardware is in debug mode (e.g., whether to send an interrupt to a hypervisor to collect debug data). In one embodiment, the assist hardware thread copies an initiating hardware thread's debug control bit to ATSR 200 when it is invoked by an initiating hardware thread.

When the assist hardware thread terminates code execution, in one embodiment, the debug controller copies the initiating thread identifier from a temporary storage location into ATSR 200 in order for the hypervisor to extract the initiating thread identifier from ATSR 200. The initiating thread identifier may be a number that identifies the initiating hardware thread. A table may also be located in memory at a place known to the hypervisor and the program that analyzed the data. In one embodiment, the initiating thread identifier may be used as an index into the table where the indexed location includes a pointer to where the actual data for that thread was to be stored. As those skilled in the art can appreciate, other embodiments are possible to correlate the thread ID to a memory location (see FIGS. 4-5 and corresponding text for further details).

Hypervisor Machine Status Save/Restore Register (HSRR) 0 register 260 and HSRR1 register 270 are hypervisor interrupt registers that are utilized for hypervisor interrupts. HSRR0 register 260 includes a next instruction address that identifies the next instruction that the assist hardware thread would execute if it had not terminated software code execution. In one embodiment, the debug controller stores this address in HSRR0 register 260 prior to sending an interrupt to the hypervisor.

HSRR1 register 270 stores a termination type identifier, which indicates a reason why the assist hardware thread terminated. In one embodiment, HSRR1 register 270 may include the values to indicate the following:

Assist thread preempted by hardware (Hardware requires resources utilized by the assist hardware thread).

Figure 8:
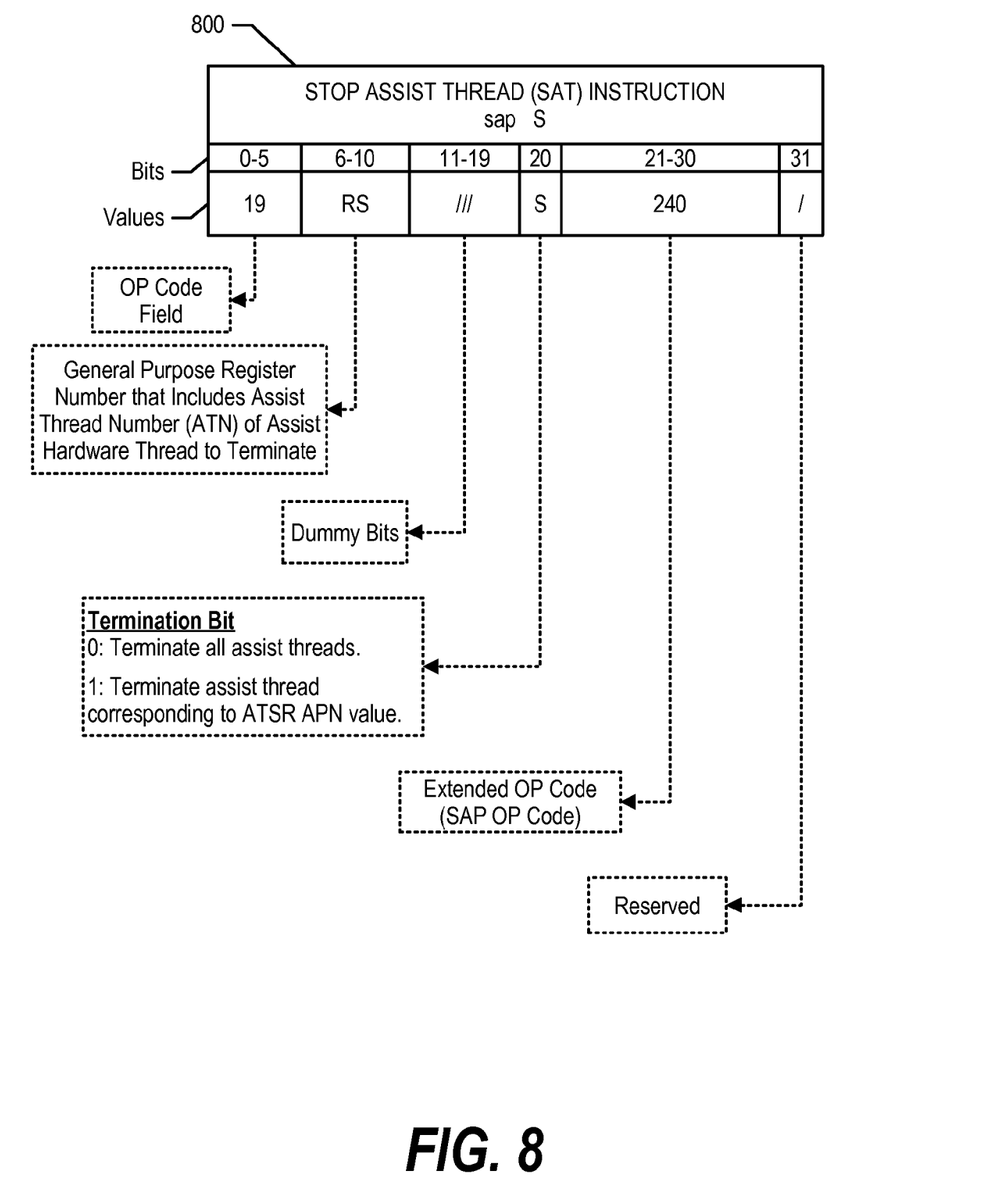
FIG. 8 is an exemplary diagram showing a stop assist thread (SAT) instruction.

Initiating thread executed a SAT instruction to terminate the assist thread (See FIG. 8 and corresponding text for further details).

Assist thread executed a SAT instruction to terminate itself (See FIG. 8 and corresponding text for further details).

Assist thread termination condition occurred (An error such as attempt to execute a resource not allowed for the assist thread).

As those skilled in the art can appreciate, the termination type identifier may include more or less bits than two bits in order to increase or decrease the amount of termination type indicators.

Figure 3:
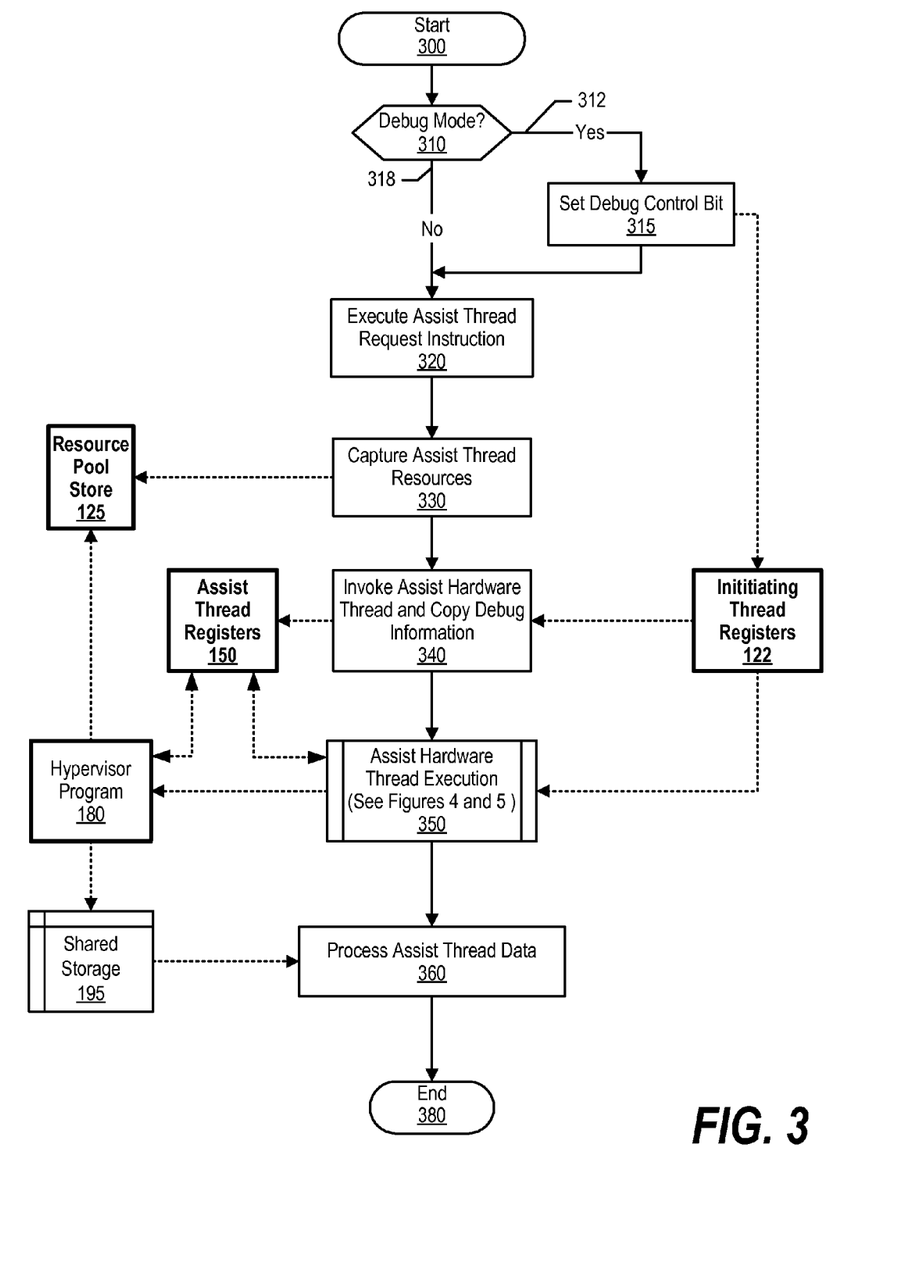
FIG. 3 is a flowchart showing steps taken in an initiating thread invoking an assist thread, which utilizes a hypervisor program to extract data prior to releasing assist thread resources.

FIG. 3 is a flowchart showing steps taken in an initiating thread invoking an assist thread, which utilizes a hypervisor program to extract data prior to releasing assist thread resources. Software program processing commences on a hardware thread (initiating thread) at 300, whereupon a determination is made as to whether the software program is in a "debug mode" (decision 310). For example, the software program may enter a debug mode in order to collect data from assist hardware threads that are prematurely terminating.

If the software program is in debug mode, decision 310 branches to "Yes" branch 312, whereupon processing sets a debug control bit in initiating thread registers 122 (e.g., initiating hardware thread 120's ATSR) at step 315. On the other hand, if the software program is not in debug mode, decision 310 branches to "No" branch 318, bypassing step 315. In one embodiment, processing clears the debug control bit in initiating thread registers 122 when the software program is not in debug mode ("No" branch 318).

At step 320, processing executes an instruction that instructs the initiating thread to invoke an assist thread. In one embodiment, the instruction may be a Branch and Initiate Light (BAIL) instruction or a Branch and Initiate Heavy (BAIH) instruction as discussed herein (see FIGS. 6-7 and corresponding text for further details).

The initiating thread captures assist thread resources from resource pool store 125 at step 330. In one embodiment, the initiating hardware thread determines whether resources are available and, if not, proceeds to execute instructions that were intended for an assist hardware thread. The initiating hardware thread invokes the assist hardware thread at step 340 and copies debug information from initiating thread registers 122 to assist thread registers 150 (e.g., the debug control bit).

In turn, the assist hardware thread executes software code until the assist hardware thread terminates code execution. At this point, when the hardware is in debug mode, the assist hardware thread invokes hypervisor program 180 to extract data from assist thread registers 150 and store the data in shared storage 195. Once stored, hypervisor program 180 releases the assist hardware thread's resources to resource pool 125 (pre-defined process block 350, see FIG. 4 and corresponding text for further details). In one embodiment, prior to executing the software code, the assist hardware thread may send an interrupt to hypervisor program 180 to pre-configure registers in order to collect specific data (see FIG. 5 and corresponding text for further details).

At step 360, a software program (debug routine) executing on the initiating thread retrieves the data from shared storage 195 and debugs the assist hardware thread accordingly. In one embodiment, the hypervisor informs the software program (e.g., initiating hardware thread) that the debug data is available for processing at a particular location in shared storage 195 (see FIGS. 4, 5, and corresponding text for further details). In another embodiment, the debug routine may execute on a different hardware thread altogether (e.g., third hardware thread). Processing ends at 380.

Figure 4:
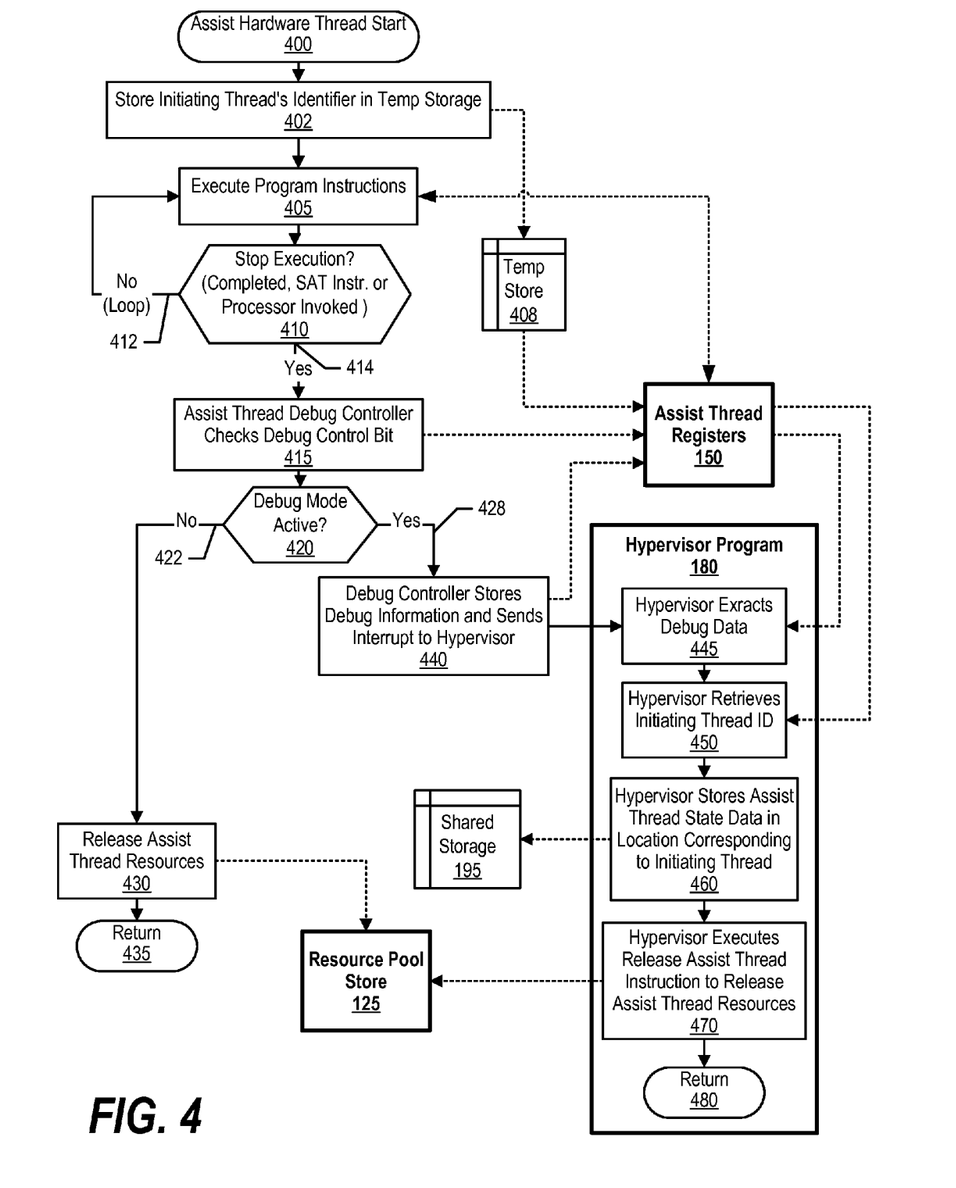
FIG. 4 is a flowchart showing steps taken in a hypervisor extracting assist hardware thread data and releasing the assist hardware thread's resources to a resource pool.

FIG. 4 is a flowchart showing steps taken in a hypervisor extracting assist hardware thread data and releasing the assist hardware thread's resources to a resource pool. Assist thread processing commences at 400, whereupon the assist hardware thread stores an initiating hardware thread's identifier in temporary store 408 at step 402, which identifies the thread that initiated the assist hardware thread. The assist hardware thread's debug controller eventually copies the initiating thread identifier to assist thread registers 150 prior to invoking an interrupt to hypervisor program 180 (discussed below).

At step 405, the assist thread executes program instructions (software code), such as instructions 140 shown in FIG. 1. During program execution, the assist hardware thread uses assist thread registers 150, such as general purpose registers and other registers The assist hardware thread determines whether to stop executing the software code in response to completing instruction execution or receiving an indication to terminate execution (decision 410). The assist hardware thread may complete instruction execution or execute a Stop Assist Thread (SAT) instruction, which instructs the assist hardware thread to terminate instruction execution (see FIG. 8 and corresponding text for further details). An initiating hardware thread may also execute a SAT instruction that, in turn, terminates the assist hardware thread. Alternatively, a processor that controls the initiating hardware thread and the assist hardware thread may terminate the assist hardware thread because the assist hardware thread's resources are required to execute other higher-priority programs.

If the assist hardware thread should continue executing instructions, decision 410 branches to "No" branch 412, which loops back to continue executing instructions. This looping continues until the assist hardware thread stops executing the program instructions, at which point decision 410 branches to "Yes" branch 414.

At step 415, a debug controller included in the assist thread checks whether the "debug control bit" is set in assist thread registers 150 (e.g., ATSR 200 shown in FIG. 2). If the debug control bit is not set, decision 420 branches to "No" branch 422, whereupon the assist hardware thread releases its resources to resource pool store 125 at step 430, and returns at 435.

On the other hand, if the debug control bit is set, decision 420 branches to "Yes" branch 428, whereupon the debug controller stores debug information in assist thread registers 150 and sends an interrupt to hypervisor program 180 (step 440). In one embodiment, the debug controller retrieves the initiating thread identifier from temporary store 408 and stores it in assist thread registers 150 (e.g., ATSR 200 shown in FIG. 2). The debug controller may also store a next instruction address in assist thread registers 150 (e.g., HSRR0 260 shown in FIG. 2), which identifies the next instruction that the assist thread would execute prior to terminating code execution. The debug controller also stores a termination type identifier in assist thread registers 150 (e.g., HSRR1 270 shown in FIG. 2), which indicates a reason why the assist hardware thread terminated execution.

At step 445, hypervisor program 180 extracts debug data from assist thread registers 150. Debug data is data that is useful to debug instructions that were executed by the assist hardware thread, which is different data from what the executing instructions are designed to store (e.g., results of calculations or other work, indicators showing how far along a particular task the program had progressed, etc.). The debug data may include data that was stored in the assist hardware thread's ATSR, general purpose registers, arithmetic registers (e.g. floating point registers), various control registers, and other special-purpose registers that include data for use in debugging instructions 140. The debug data may also include data stored in hypervisor specific registers (HSRR0 and HSRR1), such as a next instruction address that was to be executed by the program prior to the interrupt, as well as an indication of why the assist thread program terminated.

At step 450, the hypervisor retrieves an initiating thread identifier from assist thread registers 150 (e.g., ATSR 200 shown in FIG. 2), which identifies the thread that initiated the assist hardware thread. In turn, at step 460, the hypervisor stores the debug data in shared storage 195 at a location that corresponds to the initiating thread identifier. In one embodiment, a table may exist at a known memory address where the base address for a buffer of data is located. In this embodiment, at the known memory address, a set of pointers to locations at which the data for each initiating thread was located may be available. In this embodiment, the initiating thread identifier may be an index into the table. In another embodiment, the hypervisor informs the software program (e.g., initiating hardware thread) that the debug data is available for processing at the known memory address.

Figure 9:
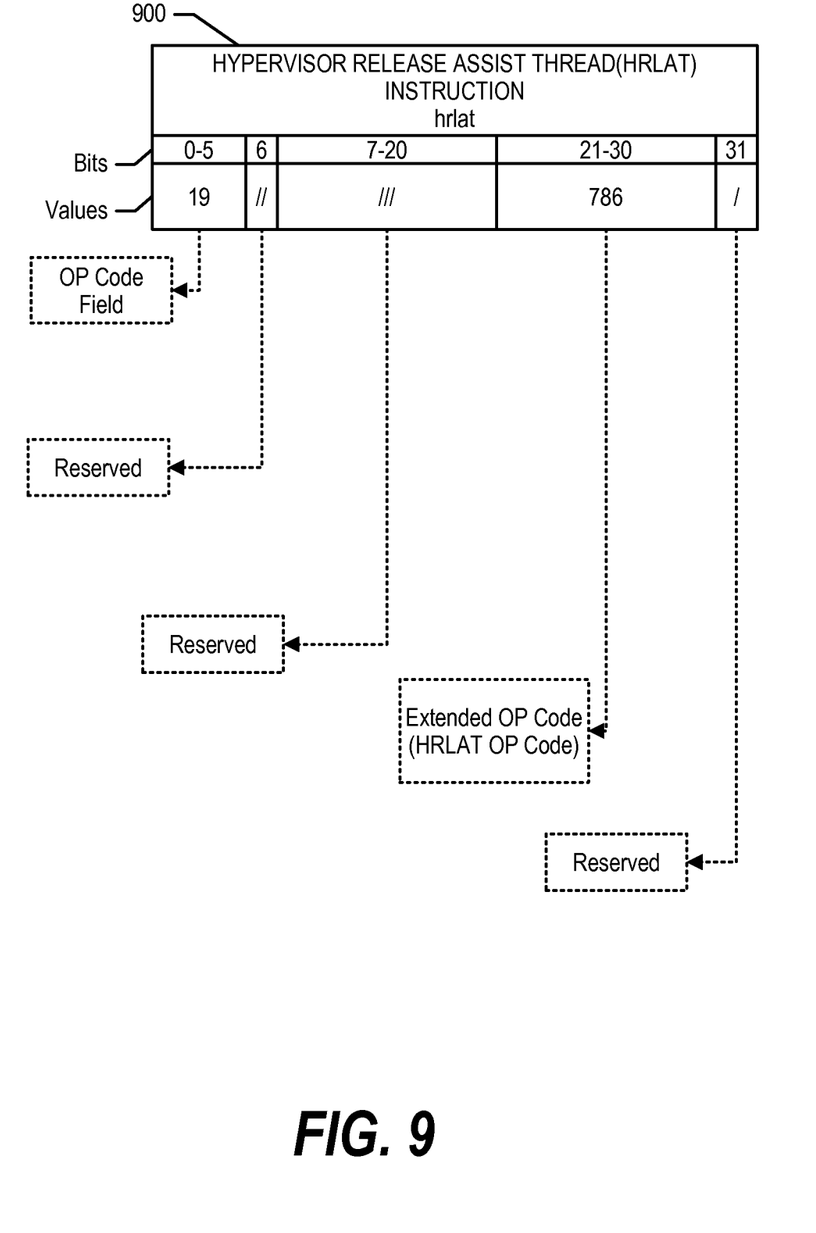
FIG. 9 is an exemplary diagram showing a hypervisor release assist thread (HRLAT) instruction.

The hypervisor executes a hypervisor release assist thread (HRLAT) instruction (step 470), which releases the assist hardware thread's resources to resource pool store 125 (see FIG. 9 and corresponding text for further details). Processing returns at 480.

Figure 5:
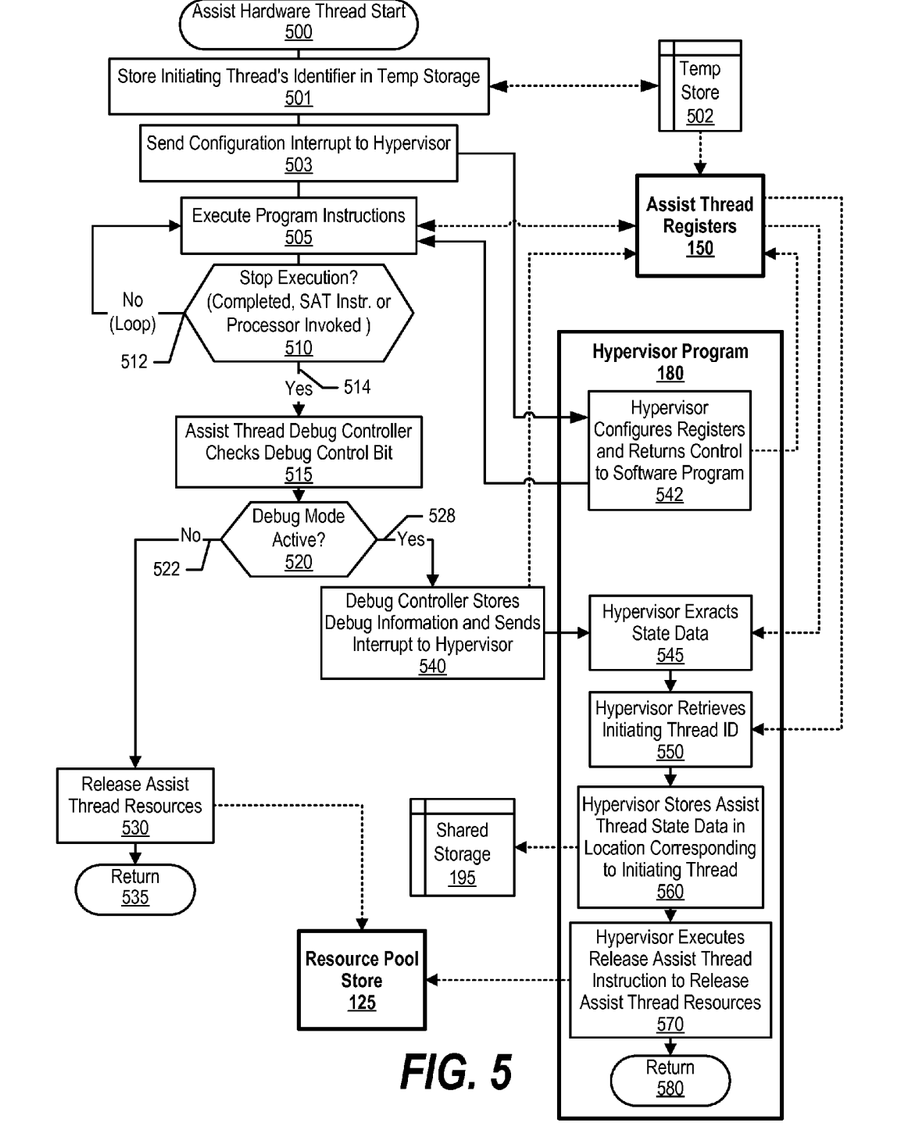
FIG. 5 is a flowchart similar to FIG. 4 with the exception of a hypervisor configuring assist thread hardware values prior to the assist thread executing software code.

FIG. 5 is a flowchart similar to FIG. 4 with the exception of a hypervisor configuring assist thread hardware values prior to the assist thread executing software code. Processing commences at 500, whereupon the assist hardware thread stores an initiating hardware thread's identifier in temporary store 502 at step 501, which identifies the thread that initiated the assist hardware thread. The assist hardware thread's debug controller eventually copies the initiating thread identifier to assist thread registers 150 prior to invoking an interrupt to hypervisor program 180 (discussed below).

At step 503, the assist hardware thread sends a configuration interrupt to hypervisor program 180. As such, hypervisor program configures assist thread registers 150 to collect particular debug data on the assist thread, and returns control to the software program at step 542. In one embodiment, the hypervisor may configure performance monitor registers on the assist thread to track various characteristics such as cache behavior, instructions executed, etc. The hypervisor may also set up special purpose debug registers or monitoring equipment.

At step 505, the assist thread executes program instructions (software code), such as instructions 140 shown in FIG. 1.

During program execution, the assist hardware thread uses assist thread registers 150, such as general purpose registers and other registers.

The assist hardware thread determines whether to stop executing the software code in response to completing instruction execution or receiving an indication to terminate execution (decision 510). The assist hardware thread may complete instruction execution or execute a Stop Assist Thread (SAT) instruction, which instructs the assist hardware thread to terminate instruction execution (see FIG. 8 and corresponding text for further details). In another embodiment, an initiating hardware thread may execute a SAT instruction that, in turn, terminates the assist hardware thread. A processor that controls the initiating hardware thread and the assist hardware thread may also terminate the assist hardware thread in order to reclaim the assist hardware thread's resources for a higher priority task.

If the assist hardware thread should continue executing instructions, decision 510 branches to "No" branch 512, which loops back to continue executing instructions. This looping continues until the assist hardware thread stops executing the program instructions, at which point decision 510 branches to "Yes" branch 514.

At step 515, a debug controller included in the assist thread checks whether the "debug control bit" is set in assist thread registers 150 (e.g., ATSR 200 shown in FIG. 2). If the debug control bit is not set, decision 520 branches to "No" branch 522, whereupon the assist hardware thread releases its resources to resource pool store 125 at step 530, and returns at 535.

On the other hand, if the debug control bit is set, decision 520 branches to "Yes" branch 528, whereupon the debug controller stores debug information in assist thread registers 150 and sends an interrupt to hypervisor program 180 (step 540). The debug controller retrieves the initiating thread identifier from temporary store 502 and stores it in assist thread registers 150 (e.g., ATSR 200 shown in FIG. 2). The debug controller may also store a next instruction address in assist thread registers 150 (e.g., HSRR0 260 shown in FIG. 2), which identifies the next instruction that the assist thread would execute prior to terminating code execution. The debug controller may also store a termination type identifier in assist thread registers 150 (e.g., HSRR1 270 shown in FIG. 2), which indicates a reason why the assist hardware thread terminated execution.

At step 545, hypervisor program 180 extracts debug data from assist thread registers 150. The debug data is data that is useful to debug instructions that were executed by the assist hardware thread, which is different data from what the executing instructions are designed to store (e.g., results of calculations or other work, indicators showing how far along a particular task the program had progressed, etc.). The debug data may include data that was stored in the assist hardware thread's ATSR, general purpose registers, arithmetic registers (e.g. floating point registers), various control registers, and other special-purpose registers that include data useful in debugging instructions 140. The debug data may also include data stored in hypervisor specific registers (HSRR0 and HSRR1), such as a next instruction address that was to be executed by the program prior to the interrupt, as well as an indication of why the assist thread program terminated.

At step 550, the hypervisor retrieves an initiating thread identifier from assist thread registers 150 (e.g., ATSR 200 shown in FIG. 2), which identifies the thread that initiated the assist hardware thread. In turn, at step 560, the hypervisor stores the debug data in shared storage 195 at a location that corresponds to the initiating thread identifier. In one embodiment, a table may exist at a known memory address where the base address for a buffer of data is located. In this embodiment, at the known memory address, a set of pointers to locations at which the data for each initiating thread was located may be available. In this embodiment, the initiating thread identifier may be an index into the table. In another embodiment, the hypervisor informs the software program (e.g., initiating hardware thread) that the debug data is available for processing at the known memory address.

The hypervisor executes a hypervisor release assist thread (HRLAT) instruction (step 570), which releases the assist hardware thread's resources to resource pool store 125 (see FIG. 9 and corresponding text for further details). Processing returns at 580.

Figure 6:
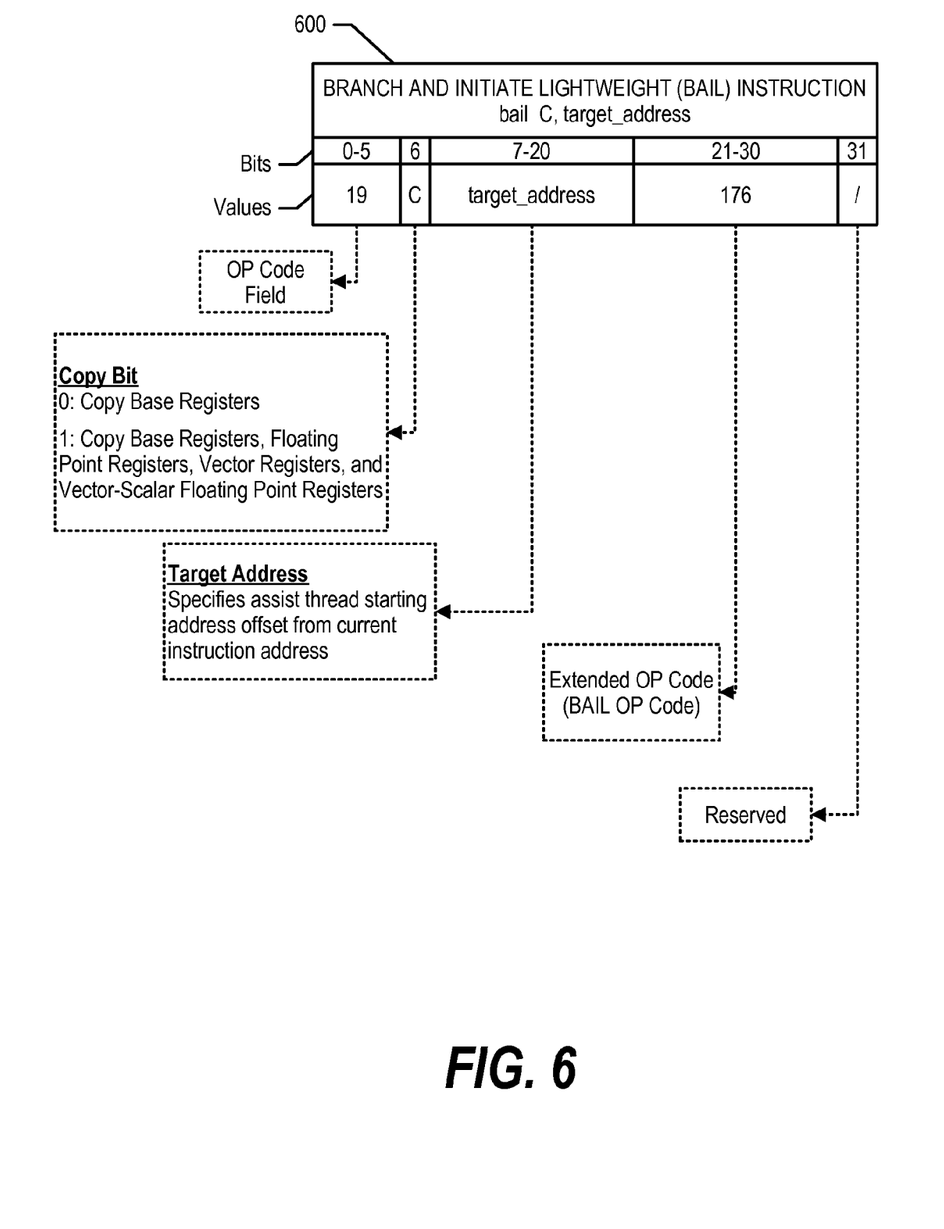
FIG. 6 is an exemplary diagram showing a branch and initiate lightweight (BAIL) instruction.

FIG. 6 is an exemplary diagram showing a branch and initiate lightweight (BAIL) instruction. BAIL instruction 600 enables software program 100 efficiently request an assist hardware thread from a multi-threaded processor without hypervisor involvement and without adversely affecting the hypervisor operation or other executing programs.

BAIL instruction 600 includes an op code field (bits 0-5) and an extended op code field (bits 21-30) that, when a hardware thread executes, instructs the hardware thread to check whether an assist hardware thread is available. If available, the initiating hardware thread copies particular register values, such as base register sets (general-purpose registers, privileged control registers, etc.), along with other register values based upon copy bit "6" (floating point, vector unit, etc.), from the initiating hardware thread's registers to the assist hardware thread's registers (see FIG. 9 and corresponding text for further details). Once copied, the assist hardware thread starts executing code corresponding to a target address located in BAIL instruction 600's bits 7-20. As those skilled in the art can appreciate, BAIL instruction 600 may include more or less bits and/or partitioned differently than what in FIG. 6 shows.

Figure 7:
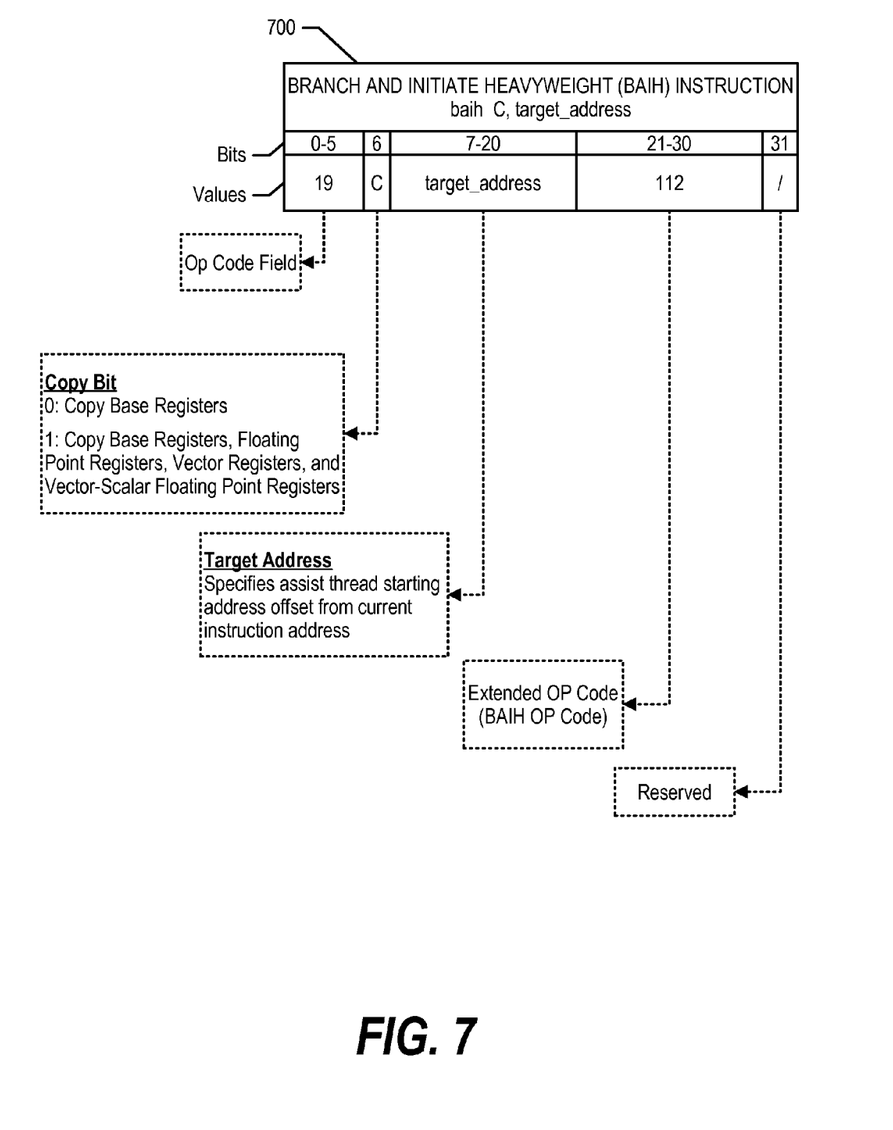
FIG. 7 is an exemplary diagram showing a branch and initiate heavyweight (BAIH) instruction.

FIG. 7 is an exemplary diagram showing a branch and initiate heavyweight (BAIL) instruction. BAIH instruction 700 is similar to BAIL instruction shown in FIG. 6. The BAIH instruction, however, may also perform a memory synchronization step compared to the BAIL instruction.

BAIL instruction includes an op code field (bits 0-5) and an extended op code field (bits 21-30) that, when a hardware thread executes, instructs the hardware thread to check whether an assist hardware thread is available. If available, the initiating hardware thread copies particular register values, such as base register sets (general-purpose registers, privileged control registers, etc.), along with other registers based upon copy bit "6" (floating point, vector unit, etc.) (see FIG. 9 and corresponding text for further details).

Once the initiating hardware thread copies the register values to the assist hardware thread registers, the assist hardware thread starts executing code corresponding to a target address located in BAIH instruction 600's bits 7-20. As those skilled in the art can appreciate, BAIH instruction may include more or less bits and/or partitioned differently than what FIG. 7 shows.

FIG. 8 is an exemplary diagram showing a stop assist thread (SAT) instruction. As an assist hardware thread executes, the assist hardware thread (or an initiating hardware thread) may execute a SAT instruction, which instructs the assist hardware thread to stop executing. When an initiating thread executes SAT instruction 800, the initiating thread instructs the assist hardware thread to stop executing (terminate). When an assist hardware thread executes SAT instruction 800, the assist thread stops its own execution.

SAT instruction 800 includes an op code field (bits 0-5) and an extended op code field (bits 21-30) that, when an initiating hardware thread executes, informs the initiating hardware thread to instruct one or more assist hardware threads to stop executing. SAT instruction 800 also includes a termination bit 20 that, when executed by an initiating hardware thread, instructs the initiating hardware thread to either terminate all active assist hardware threads or terminate a particular assist hardware thread. When bit 20 signifies terminating a particular assist hardware thread, bits 6-10 include a source register (RS) location (e.g., general-purpose register location) that includes an assist thread number (ATN) corresponding to the assist hardware thread for which to terminate.

When an assist hardware thread executes SAT instruction 800, the assist hardware thread may use bit 20 to pass back a SAT parameter to its initiating hardware thread. For example, the assist hardware thread may store a "1" in bit 20 when it completes the code execution and may store a "0" in bit 20 when it fails to complete the code execution. In this embodiment, the assist hardware thread ignores bits 6-10 when it executes SAT instruction 800.

In yet another embodiment, SAT instruction 800 may be devoid of an RS field (bits 6-10). In this embodiment, the initiating hardware thread terminates all active assist hardware threads it initiated, regardless of bit 20's value (e.g., ignores bit 20).

FIG. 9 is an exemplary diagram showing a hypervisor release assist thread (HRLAT) instruction. HRLAT instruction 900 includes an op code field (bits 0-5) and an extended op code field (bits 21-30) that, when a hypervisor executes on an assist hardware thread, releases the assist hardware thread's resources to a resource pool.

Figure 10:
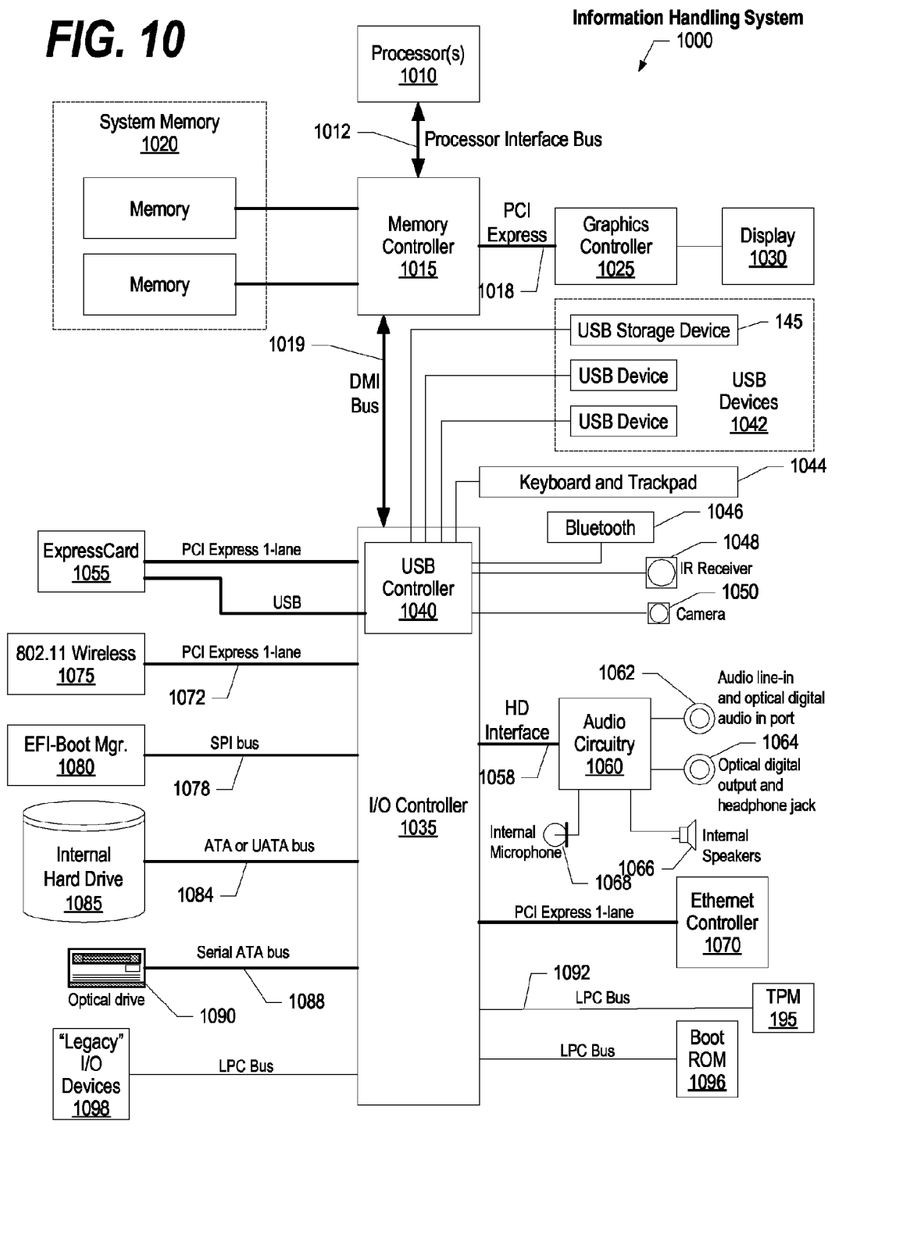
FIG. 10 is a block diagram example of a data processing system in which the methods described herein can be implemented.

FIG. 10 illustrates information handling system 1000, which is a simplified example of a computer system capable of performing the computing operations described herein. Information handling system 1000 includes one or more processors 1010 coupled to processor interface bus 1012. Processor interface bus 1012 connects processors 1010 to memory controller 1015, which is also known as a Memory Controller Hub (MCH). Memory controller 1015 connects to system memory 1020 and provides a means for processor(s) 1010 to access the system memory. Graphics controller 1025 also connects to memory controller 1015. In one embodiment, PCI Express bus 1018 connects memory controller 1015 to graphics controller 1025. Graphics controller 1025 connects to display device 1030, such as a computer monitor.

Memory controller 1015 and I/O Controller 1035 connect to each other using bus 1019. In one embodiment, the bus is a Direct Media Interface (DMI) bus that transfers data at high speeds in each direction between memory controller 1015 and I/O Controller 1035. In another embodiment, a Peripheral Component Interconnect (PCI) bus connects the Memory Controller and the I/O Controller. I/O Controller 1035, also known as the I/O Controller Hub (ICH) is a chip that generally implements capabilities that operate at slower speeds than the capabilities provided by the Memory Controller. I/O Controller 1035 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 1096 and "legacy" I/O devices (using a "super I/O" chip). The "legacy" I/O devices (1098) can include, for example, serial and parallel ports, keyboard, mouse, and/or a floppy disk controller. The LPC bus also connects I/O Controller 1035 to Trusted Platform Module (TPM) 1095. Other components often connected to I/O Controller 1035 include a Direct Memory Access (DMA) controller, a Programmable Interrupt Controller (PIC), and a storage device controller, which connects I/O Controller 1035 to nonvolatile storage device 1085, such as a hard disk drive, using bus 1084.

ExpressCard 1055 is a slot that connects hot-pluggable devices to the information handling system. ExpressCard 1055 supports both PCI Express and USB connectivity as it connects to I/O Controller 1035 using both the Universal Serial Bus (USB) the PCI Express bus. I/O Controller 1035 includes USB Controller 1040 that provides USB connectivity to devices that connect to the USB. These devices include webcam (camera) 1050, infrared (IR) receiver 1048, keyboard and trackpad 1044, and Bluetooth device 1046, which provides for wireless personal area networks (PANs). USB Controller 1040 also provides USB connectivity to other miscellaneous USB connected devices 1042, such as a mouse, removable nonvolatile storage device 1045, modems, network cards, ISDN connectors, fax, printers, USB hubs, and many other types of USB connected devices. While removable nonvolatile storage device 1045 is shown as a USB-connected device, removable nonvolatile storage device 1045 could be connected using a different interface, such as a Firewire interface, etcetera.

Wireless Local Area Network (LAN) device 1075 connects to I/O Controller 1035 via the PCI or PCI Express bus 1072. LAN device 1075 typically implements one of the IEEE 802.11 standards of over-the-air modulation techniques that all use the same protocol to wirelessly communicate between information handling system 1000 and another computer system or device. Optical storage device 1090 connects to I/O Controller 1035 using Serial ATA (SATA) bus 1088. Serial ATA adapters and devices communicate over a high-speed serial link. The Serial ATA bus also connects I/O Controller 1035 to other forms of storage devices, such as hard disk drives. Audio circuitry 1060, such as a sound card, connects to I/O Controller 1035 via bus 1058. Audio circuitry 1060 also provides functionality such as audio line-in and optical digital audio in port 1062, optical digital output and headphone jack 1064, internal speakers 1066, and internal microphone 1068. Ethernet controller 1070 connects to I/O Controller 1035 using a bus, such as the PCI or PCI Express bus. Ethernet controller 1070 connects information handling system 1000 to a computer network, such as a Local Area Network (LAN), the Internet, and other public and private computer networks.

While FIG. 10 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. An information handling system comprising:
   one or more processors;
   a memory coupled to at least one of the processors;
   a set of computer program instructions stored in the memory and executed by at least one of the processors in order to perform actions of:
      identifying a request, at a first hardware thread included in one of the processors, to initiate a second hardware thread;
      executing software code on the second hardware thread included in one of the processors, wherein the executing includes the second hardware thread storing data in one or more hardware registers included in one of the processors;
      invoking a hypervisor in response to identifying that the second hardware thread ceases execution of the software code;
      extracting, by the hypervisor, the data from one or more of the hardware registers;
      storing, by the hypervisor, the extracted data in a shared memory area included in the memory; and
      executing a debug routine that retrieves the extracted data from the shared memory area.

2. The information handling system of claim 1 wherein:
   the debug routine is executed on the first hardware thread;
   the one or more hardware registers are dedicated to the second hardware thread during the software code execution, making them inaccessible to the first hardware thread; and
   the extracted data is debug data that the debug routine utilizes to debug the software code that was executed on the second hardware thread.

3. The information handling system of claim 2 wherein: the debug data includes one or more termination indicators; and
   at least one of the termination indicators is selected from the group consisting of a next instruction address and a termination type identifier.

4. The information handling system of claim 1 wherein the processors perform additional actions comprising:
   in response to ceasing execution of the software code, maintaining hardware resources dedicated to the second hardware thread, wherein the one or more hardware registers are included in the dedicated hardware resources; and
   releasing, by the hypervisor, the dedicated hardware resources to a resource pool in response to extracting the data.

5. The information handling system of claim 1 wherein the second hardware thread includes a debug controller, and wherein the processors perform additional actions comprising:
   checking, by the debug controller, a debug control bit stored in one of the hardware registers; and
   invoking the hypervisor, by the debug controller, in response to determining that the debug control bit is set.

6. The information handling system of claim 1 wherein the processors perform additional actions comprising:
   executing, by the hypervisor, a hypervisor release assist thread instruction; and
   wherein the releasing results in clearing the one or more hardware registers.

7. The information handling system of claim 1 wherein the processors perform additional actions comprising:
   sending a configuration interrupt from the second hardware thread to the hypervisor; and
   in response to receiving the configuration interrupt, configuring, by the hypervisor, the one or more hardware registers.

8. The information handling system of claim 1 wherein the processors perform additional actions comprising:
   retrieving, by the hypervisor, a first thread identifier from the one or more hardware registers;
   storing the extracted data in a shared storage location corresponding to the first thread identifier; and
   informing the first hardware thread that the extracted data is stored in the shared storage location.

9. A computer program product stored in a computer readable storage medium, comprising computer program code that, when executed by an information handling system, causes the information handling system to perform actions comprising:
   identifying a request, at a first hardware thread included a processor, to initiate a second hardware thread;
   executing software code on the second hardware thread included in the processor, wherein the executing includes the second hardware thread storing data in one or more hardware registers included in the processor;
   invoking a hypervisor in response to identifying that the second hardware thread ceases execution of the software code;
   extracting, by the hypervisor, the data from one or more of the hardware registers;
   storing, by the hypervisor, the extracted data in a shared memory area; and
   executing a debug routine that retrieves the extracted data from the shared memory area.

10. The computer program product of claim 9 wherein:
    the debug routine is executed on the first hardware thread;

the one or more hardware registers are dedicated to the second hardware thread during the software code execution, making them inaccessible to the first hardware thread; and the extracted data is debug data that the debug routine utilizes to debug the software code that was executed on the second hardware thread.

11. The computer program product of claim 10 wherein:

the debug data includes one or more termination indicators; and at least one of the termination indicators is selected from the group consisting of a next instruction address and a termination type identifier.

12. The computer program product of claim 9 wherein the information handling system performs further actions comprising:

in response to ceasing execution of the software code, maintaining hardware resources dedicated to the second hardware thread, wherein the one or more hardware registers are included in the dedicated hardware resources; and releasing, by the hypervisor, the dedicated hardware resources to a resource pool in response to extracting the data.

13. The computer program product of claim 9 wherein the second hardware thread includes a debug controller, and wherein the information handling system performs further actions comprising:

checking, by the debug controller, a debug control bit stored in one of the hardware registers; and invoking the hypervisor, by the debug controller, in response to determining that the debug control bit is set.

14. The computer program product of claim 9 wherein the information handling system performs further actions comprising:

executing, by the hypervisor, a hypervisor release assist thread instruction; and wherein the releasing results in clearing the one or more hardware registers.

15. The computer program product of claim 9 wherein the information handling system performs further actions comprising:

sending a configuration interrupt from the second hardware thread to the hypervisor; and in response to receiving the configuration interrupt, configuring, by the hypervisor, the one or more hardware registers.

16. The computer program product of claim 9 wherein the information handling system performs further actions comprising:

retrieving, by the hypervisor, a first thread identifier from the one or more hardware registers;

storing the extracted data in a shared storage location corresponding to the first thread identifier; and informing the first hardware thread that the extracted data is stored in the shared storage location.

* * * * *